(12) United States Patent
Ribiere et al.

(10) Patent No.: US 7,894,433 B2
(45) Date of Patent: Feb. 22, 2011

(54) DEFAULT GATEWAY ROUTER SUPPLYING IP ADDRESS PREFIXES ORDERED FOR SOURCE ADDRESS SELECTION BY HOST DEVICE

(75) Inventors: Vincent Jean Ribiere, Biot (FR); Pascal Thubert, La Colle sur Loup (FR); Patrick Wetterwald, Mouans Sartoux (FR); Eric M. Levy-Abegnoli, Valbonne (FR)

(73) Assignee: Cisco Technology, Inc., San Jose, CA (US)

( * ) Notice: Subject to any disclaimer, the term of this patent is extended or adjusted under 35 U.S.C. 154(b) by 1475 days.

(21) Appl. No.: 11/198,190

(22) Filed: Aug. 8, 2005

(65) Prior Publication Data

US 2007/0030855 A1 Feb. 8, 2007

(51) Int. Cl.
    *H04L 12/28* (2006.01)
(52) U.S. Cl. .................. 370/392; 370/401; 370/389; 370/466; 370/432; 370/329
(58) Field of Classification Search ............ 370/401, 370/389, 392, 466, 432, 329
See application file for complete search history.

(56) References Cited

U.S. PATENT DOCUMENTS

| | | | | |
|---|---|---|---|---|
| 6,243,754 B1 * | 6/2001 | Guerin et al. | ............... | 709/227 |
| 6,865,611 B1 * | 3/2005 | Bragg | .................. | 709/238 |
| 7,284,068 B1 * | 10/2007 | Ramalho | .................... | 709/245 |
| 7,292,539 B2 * | 11/2007 | Ko et al. | .................... | 370/252 |
| 7,301,957 B2 * | 11/2007 | Lee et al. | .................... | 370/432 |
| 7,308,495 B2 * | 12/2007 | Ishiyama et al. | ............ | 709/223 |
| 7,330,486 B2 * | 2/2008 | Ko et al. | .................... | 370/475 |
| 7,447,798 B2 * | 11/2008 | Klinker | ...................... | 709/240 |
| 2001/0046223 A1 * | 11/2001 | Malki et al. | ................. | 370/338 |
| 2002/0078223 A1 * | 6/2002 | Baldonado et al. | .......... | 709/232 |
| 2004/0111529 A1 * | 6/2004 | Parmar | ....................... | 709/245 |
| 2004/0146042 A1 * | 7/2004 | Ideshita et al. | .............. | 370/349 |
| 2004/0246931 A1 * | 12/2004 | Thubert et al. | .............. | 370/338 |
| 2005/0047348 A1 * | 3/2005 | Suzuki et al. | ............... | 370/252 |
| 2005/0089015 A1 * | 4/2005 | Tsuge et al. | ................. | 370/351 |

(Continued)

OTHER PUBLICATIONS

Matsumoto et al., "Source Address Selection Policy Distribution for Multihoming", <draft-arifumi-multi6-sas-policy-dist-00.txt> Internet Engineering Task Force, Internet Draft, Oct. 12, 2004.

(Continued)

*Primary Examiner*—Ricky Ngo
*Assistant Examiner*—Dewanda Samuel
(74) *Attorney, Agent, or Firm*—Leon R. Turkevich (57) ABSTRACT

A default gateway router of a multi-homed site is configured for supplying, to a host device, a plurality of address prefixes having been advertised by respective exit routers providing respective connecting links for the multi-homed site to a wide area network. The default gateway router sends the address prefixes to the host device in a determined order based on a determined preference in the default gateway router for reaching the respective exit routers. The host device is configured for selecting a source address according to the determined order supplied by the default gateway router. The address also prefixes may be grouped according to identified destination prefixes, enabling the host device to select, for a given identified destination prefix, the source address according to the ordering of address prefixes within the corresponding group.

29 Claims, 6 Drawing Sheets

U.S. PATENT DOCUMENTS

| | | | |
|---|---|---|---|
| 2005/0099971 A1* | 5/2005 | Droms et al. | 370/328 |
| 2005/0102415 A1* | 5/2005 | Ishiyama et al. | 709/238 |
| 2005/0111377 A1* | 5/2005 | Lioy et al. | 370/252 |
| 2006/0018301 A1* | 1/2006 | Schrufer | 370/351 |
| 2006/0140177 A1* | 6/2006 | Karhu | 370/356 |
| 2006/0251044 A1* | 11/2006 | Haddad | 370/349 |
| 2007/0008949 A1* | 1/2007 | Balandin | 370/351 |

OTHER PUBLICATIONS

Huitema, "IPv6 Site Renumbering", Internet Dtaft, <draft-huitema-ipv6-renumber00.txt>, Jul. 12, 2001.

Huitema et al., "Ingress filtering compatibility for IPv6 multihomed sites", <draft-huitema-multi6-ingress-filtering-00>, Network Working Group, Internet Draft, Oct. 16, 2004.

Draves et al., "Default Router Preferences and More-Specific Routes", <draft-ietf-ipv6-router-selection-07.txt>, IPng Working Group, Internet Draft, Jan. 17, 2005.

Deering et al., "Internet Protocol, Version 6 (IPv6) Specification", Network Working Group, Request for Comments: 2460, Dec. 1998.

Narten, et al., "Neighbor Discovery for IP Version 6 (IPv6)", Network Working Group, Request for Comments: 2461, Dec. 1998.

Thomson et al, "IPv6 Stateless Address Autoconfiguration", Network Working Group, Request for Comments: 2462, Dec. 1998.

Conta et al., "Internet Control Message Protocol (ICMPv6) for the Internet Protocol Version 6 (IPv6) Specification", Network Working Group, Request for Comments: 2463, Dec. 1998.

Crawford, "Router Renumbering for IPv6", Network Working Group, Request for Comments: 2894, Aug. 2000.

Droms, et al.., "Dynamic Host Configuration Protocol for IPv6 (DHCPv6)", Network Working Group, Request for Comments: 3315, Jul. 2003.

Abley et al., "Goals for IPv6 Site-Multihoming Architectures", Network Working Group, Request for Comments: 3582, Aug. 2003.

Troan et al., "IPv6 Prefix Options for Dynamic Host Configuration Protocol (DHCP) version 6", Network Working Group, Request for Comments: 3633, Dec. 2003.

"Site Multihoming in IPv6 (multi6)", <http://ietf.org/html.charters/multi6-charter.html> Jul. 6, 2005.

* cited by examiner

DEFAULT GATEWAY ROUTER SUPPLYING IP ADDRESS PREFIXES ORDERED FOR SOURCE ADDRESS SELECTION BY HOST DEVICE

BACKGROUND OF THE INVENTION

1. Field of the Invention

The present invention relates to selection of an Internet Protocol (IP) source address for a host device to access a destination via a multi-homed site having multiple paths to the destination. In particular, the present invention relates to communicating, to a host device in the multi-homed site, default router preferences from a default gateway router configured for providing to the host device an access connection to the multi-homed site.

2. Description of the Related Art

A multi-homed site is a site (e.g., a private local area network or wide area network) which has more than one connection to a public wide area network, such as the Internet. The multiple connections by the site may be provided by a single Internet Service Provider (ISP) providing multiple links to the public wide area network, or by different ISPs providing respective links to the public wide area network. In addition, the multiple links may be located at separate geographic locations. Advantages to a multi-homed site include improved fault tolerance, load-balancing, etc.

Multi-homing solutions today apply to both IPv4 and IPv6 networks: a site obtains a dedicated block of address space (i.e., a prescribed address prefix) from each ISP, and assuming multiple ISPs are employed, the site advertises the routes for the respective address prefixes via the respective ISP connections. A disadvantage of advertising multiple prefixes, however, is that it multiplies the number of routes that need to be distributed throughout the "Default Free Zone" (DFZ) between the site and the public wide area network.

The Internet Engineering Task Force (ETF) has established a Working Group, entitled the "Site Multihoming in IPv6 (multi6)" Working Group, that addresses technical issues associated with implementing a multi-homed site. As described on the "Multi6" working group web site, publicly available at the web site address "ietf.org/html.charters/multi6-charter.html", multihoming today is done largely by having a site obtain a dedicated block of address space and then advertising a route for its prefix through each of its ISP connections. The address block may be from the so-called provider independent space, or may be a sub-allocation from one of its ISPs. A site's ISPs in turn advertise the prefix to some or all of their upstream connections and the route for the prefix may propagate to all of the routers connected to the default-free zone (DFZ). As the number of sites multihoming in this manner increase, the number of routes propagated throughout the DFZ increases and overall routing stability decreases because of the burden on convergence time.

The Multi6 Working Group has stated on its web page that it will seek alternative approaches with better scaling properties. Additional details regarding the goals for IPv6 site multihoming architectures is described in its Request for Comments (RFC) 3582.

One of the fundamental problems that need to be addressed in the context of multi-homed sites-involves the interaction between legacy host devices and ingress filtering by access routers providing a connection between the site and the public wide area network. In particular, a site having two access routers from respective ISPs and that follow source address ingress filtering rules may encounter packets being dropped if the packets do not comply with the source address ingress filtering rules. For example, the Internet Draft by Huitema et al., "Ingress filtering compatibility for IPv6 multihomed sites" (draft-huitema-multi6-ingress-filtering-00) describes that ingress filtering, normally used to verify the source address of the IP packets in order to prevent denial of service attacks based on using "spoofed" source addresses, actually may cause an access router to drop legitimate packets due to a host device utilizing an IP source address that is within an assigned address prefix of another access router and that is outside the address prefix range of the access router receiving the IP packet. Huitema et al. proposes minimizing ingress filtering conflicts by creating source address dependent (SAD) routing, where routers in the source based routing domain maintained as many parallel routing tables as there are valid source prefixes, causing the packets to exit the site to the appropriate router. Huitema et al. also proposes adding and exit router discovery mechanism within host devices to enable the host device to discover the preferred exit router for a given source address; hence, the host device can tunnel the packet directly to the adequate exit router.

Unfortunately, the source address selection in Huitema et al. is still performed randomly by the host device, and does not address that a given source address may be preferred in certain instances. Moreover, the above-identified Internet Draft by Huitema et al. does not address exploiting the advantage of redundancy in a multi-homing site. Further, the SAD routing proposed by Huitema et al. requires multiple instances of the routing protocol to be executed for respective prefixes; hence, each instance of the routing protocol only will possess knowledge learned through the corresponding ISP associated with the address prefix: if one of the ISPs encounters a failure, the default route will not be advertised by the corresponding exit router, causing routers within the site to remove the default route entry from their default routing tables; however, the multi-homed host device will be unaware of the unavailability of the failed ISP. Hence, a problem arises that a multi-homed host device may continue to send packets using a source address derived from an address prefix that has been assigned by the failed ISP.

One proposal for multi-homed host devices is described in an Internet Draft by Draves et al., entitled "Default Router Preferences and More-Specific Routes" (draft-ietf-ipv6-router-selection-07.txt), that extends Neighbor Discovery as described in RFC 2461 by modifying "router advertisement messages" (i.e., layer 2 neighbor discovery messages sent to connected on-link hosts) to include preference information. In particular, Draves et al. and RFC 2461 describe sending neighbor discovery messages to hosts that are connected on the same link: Section 2 of RFC 2461 defines "neighbors" as "nodes attached to the same link", where a "link" is defined as "a communication facility or medium over which nodes can communicate at the link layer, i.e., the layer immediately below IP"; hence, the neighbor discovery messages are described herein as "layer2 neighbor discovery messages" because they require that a host be connected to the router via a single connecting link.

Draves et al. describes that a router outputs a layer 2 neighbor discovery message that specifies a "preference value" indicating whether the router should be preferred as a default router over other routers; the layer 2 neighbor discovery message also can specify a Route Information Option field indicating whether the router should be preferred over other routers in reaching a corresponding specified address prefix. Hence, the host device receiving the layer 2 neighbor discovery message according to Draves et al. can build its own routing table, where each routing table entry specifies a prefix, prefix length, preference value, lifetime, and next-hop router. The host device can then search its routing table for the most preferred next-hop router for reaching an "off-link" destination address prefix (i.e. an address prefix that is not assigned to any interface on a link connecting the host device to a next-hop router). Hence, the host device selects a default router based on the a matching routing table entry matching the destination address prefix.

The Internet Draft by Draves et al., however, does not address ingress filtering nor the problems associated with redundancy of a multi-homed site, hence, the multi-homed host device may continue to send packets using a source address derived from an address prefix that has been assigned by the failed ISP: any rerouting within the multi-homed site will result in ingress filtering by the alternate exit router. Further, the Internet Draft by Draves et al. assumes there is more than one default gateway router available to the host device, and is inapplicable if the client device is in communication with only one default gateway router.

SUMMARY OF THE INVENTION

The above-described proposals either rely on a router (e.g., a default gateway router) to assign a source address to a host device, or modify the host device to select a next-hop router for a given destination: the former proposal of requiring a default gateway router to assign a source address to a host device based on available address prefixes advertised by respective exit routers limits the flexibility of the host device in using different source address values, especially since the default gateway router needs to reconfigure the host device if an alternate source address is preferred; the latter proposal of selecting a next-hop router for a given destination fails to address the above-described problems with respect to resolving multi-homing with ingress filtering rules.

Hence, there is a need for an arrangement that enables a host device in a multi-homed site to exploit the advantageous redundancy of multiple connections to a wide area network, without encountering disruption due to ingress filtering rules implemented in exit routers providing the respective multiple connections.

There also is a need for an arrangement that enables a default gateway router (defined herein as the router providing an access connection between the host device and the multi-homed site) to implement cost-based routing policies based on conveying routing information to a host device that enables the host device to automatically implement the routing policies based on source address selection solely within the host device.

There also is a need that enables a host device to perform its own source address selection for optimized communications with nodes via a multi-homed site having multiple connections to a wide area network, the nodes including nodes within the site and nodes external to the site and reachable via one of the multiple connections.

These and other needs are attained by the present invention, where a default gateway router of a multi-homed site is configured for supplying to a host device a plurality of address prefixes having been advertised by respective exit routers providing respective connecting links for the multi-homed site to a wide area network. The default gateway router sends the address prefixes to the host device in a determined order based on a determined preference in the default gateway router for reaching the respective exit routers. The host device is configured for selecting a source address according to the determined order supplied by the default gateway router. In addition, identified destination prefixes may be grouped with the address prefixes, enabling the host device to select, for a given identified destination prefix, the source address that should be selected.

Hence, the routing table policies in the default gateway router can be applied within the host device based on supplying the address prefixes in the appropriate order, without requiring the host device to implement complex cost-based routing protocols such as distance vector routing protocol or link state routing protocol. Moreover, the host device can automatically employ source address selection in a manner that exploits the advantageous redundancy of a multi-homed site having multiple connections to a wide area network, while preserving the requirements of the ingress filtering rules implemented in exit routers. Further, the host device can select different source addresses for optimized routing within the multi-homed site.

One aspect of the present invention provides a method in a default gateway router configured for providing an access connection for a host device in a multi-homed site. The method includes receiving, by the default gateway router, first and second routing protocol exit router messages identifying first and second distinct address prefixes having been advertised by first and second exit routers, respectively. The first and second exit routers provide respective connections between the multi-homed site and a wide area network. The method also includes determining in the default gateway router a preference for reaching the first and second exit routers, and sending by the default gateway router a third address prefix within a first address range of the first address prefix, and a fourth address prefix within a second address range of the second address prefix. The third and fourth address prefixes are in a determined order based on the determined preference of the respective first and second exit routers, enabling the host device to select a source address from the third and fourth address prefixes according to the determined order.

Another aspect of the present invention provides a multi-homed site configured for obtaining a plurality of access connections to a wide area network via first and second exit routers. The multi-homed site includes a default gateway router, and a host device. The default gateway router is configured for receiving first and second routing protocol exit router messages identifying first and second distinct address prefixes having been advertised by the first and second exit routers, respectively. The default gateway router also is configured for determining a preference for reaching the first and second routers, and outputting a routing protocol exit router message specifying a third address prefix within a first address range of the first address prefix, and a fourth address prefix within a second address range of the second address prefix, in a determined order based on the determined preference of the respective first and second exit routers. The host device is configured for selecting a source address from one of the third and fourth address prefixes according to the determined order.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 1:
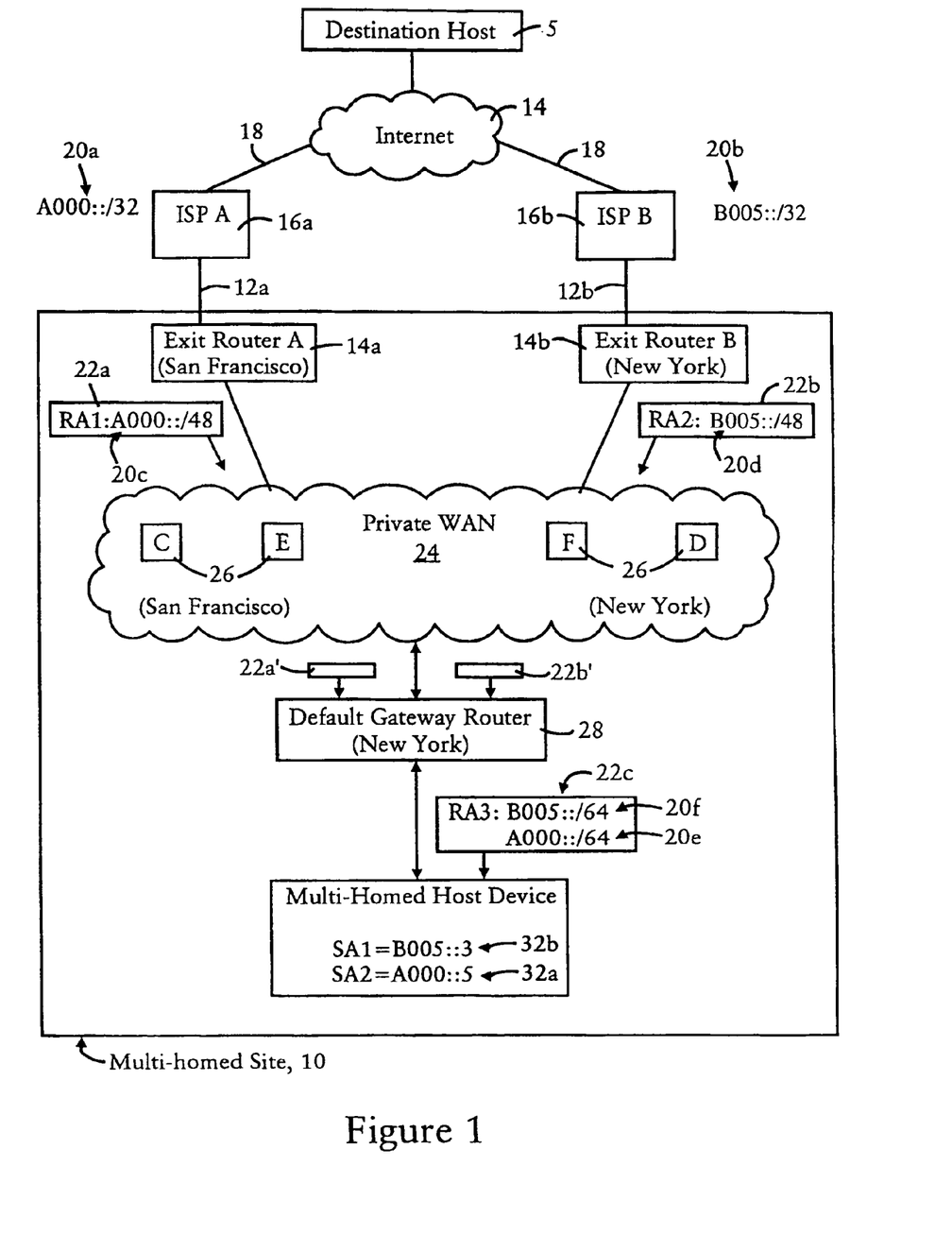
FIG. 1 is a diagram illustrating a multi-homed site providing multiple access connections to a wide area network via multiple exit routers, according to an embodiment of the present invention.

FIG. 1 is a diagram illustrating a multi-homed site 10 providing multiple access connections 12a, 12b via a wide area network 14, according to an embodiment of the present invention. In particular, the multi-homed site 10 includes exit routers 14a and 14b that provide the respective access connections 12a and 12b to Internet Service Providers 16a and 16b. The Internet Service Providers (ISPs), for example providers such as AT&T or Sprint, have high-capacity links 18 to the wide area network 14, for example the Internet. As recognized in the art, the access connections 12a and 12b may be implemented as T1 or T3 lines, or even OC-3 (STM-1) links for enterprise networks, whereas the high-capacity links 18 typically may be implemented as OC-48 (STM-16) links and above.

Typically an administrator of the multi-homed site 10 receives the exit router 14a or 14b from the associated ISP 16a or 16b upon establishment of a service contract with the ISP; the ISP also will assign an address block to the assigned router 14 for use by the site 10. As illustrated in FIG. 1, the ISP 16a is assigned the address prefix "A000::/32" 20a and the ISP 16b is assigned the address prefix "B005::/32" 20b, for example by the Internet Assigned Numbers Authority (TANA). The ISPs 16a and 16b assign a subset of their respective address prefixes 20a and 20b for use by the site 10 via the respective exit routers 14a and 14b. Hence, the exit router 14a is assigned the address prefix "A000::/48" 20c, and the exit router 14b is assigned the address prefix "B005::/48" 20d.

The exit routers 14a and 14b begin advertising their assigned address prefixes to the private wide area network 24 of the site 10 based on outputting routing protocol exit router messages 22a and 22b that identify the distinct address prefixes 20c and 20d, respectively. As described below, the routing protocol exit router messages 22a and 22b advertise default exit routes toward the wide area network 14, enabling routers 26 within the private network 24 to establish default routes according to the existing routing protocols. In addition, the use of the term "routing protocol" signifies that the messages 22a and 22b are generated based on existing cost-based routing protocols that determine routes based on associated costs. As recognized in the art, the routers 26 also will establish routing tables that identify multiple alternative routes to destinations, using cost-based protocols such as link state routing protocol or distance vector protocol. Consequently, the routing protocol exit router messages 22a and 22b can traverse multiple hops in a network as described below, and hence are distinguishable from the layer 2 neighbor discovery messages that can be sent only to a host on a connecting link.

As illustrated in FIG. 1, the default gateway router 28 is configured for establishing routes in response to reception of the respective routing protocol exit router messages 22a' and 22b'. As apparent from the foregoing, the routing protocol exit router messages 22a' and 22b' received by the default gateway router 26 actually are output by a next hop router which includes the routing information having been specified in the original routing protocol exit router messages 22a and 22b, respectively. Hence, the routing protocol exit router message 22a' includes the prefix information 20c advertised by the message 22a, and the routing protocol exit router message 22b' includes the prefix information 20d advertised by the message 22b. The default gateway router 28, having established default routes to the wide area network 14, can begin advertising assigned address prefixes "A000::/64" 20e and "B005::/64" 20f to a host device 30 based on outputting the routing protocol exit router message 22c.

As described in RFC 2461, the host device 30 can parse the routing protocol exit router message 22c in order to obtain the prefix information, namely the address prefixes 20e and 20f, and perform of autonomous address configuration as specified in RFC 2462, entitled "IPv6 Stateless Address Autoconfiguration", in order to automatically obtain a source address 32a and 32b from each advertised address prefix 20e and 20f.

According to the disclosed embodiment, source address selection by the multi-homed device 30 is optimized based on the preferences established by the default gateway router 28 in reaching the exit routers 14a and 14b. In particular, FIG. 1 illustrates that the multi-homed site 10 includes a large-scale private network, such that the exit router 14a is located in San Francisco, Calif., and the exit router 14b is located in New York. In addition, the default gateway router 28 is located in New York, such that the default gateway router 28 will have determined based on existing routing protocols that the cost for reaching the exit router 14b is substantially less than the corresponding cost for reaching the exit router 14a. As described in detail below with respect to FIGS. 4 and 5, the default gateway router 28 orders the address prefixes 20e and 20f in the routing protocol exit router message 22c according to the respective preferences for reaching the routers 14 and 14b having ownership of the respective prefixes. In this case, the routing protocol exit router message 22c will first specify the address prefix 20f, followed by the address prefix 20e, enabling the host device 30 to identify that the address prefix "B005::/64" 20f is preferred for source address selection over the address prefix "A000::/64" 20e. Hence, the host device 30 will prefer selecting the source address "B005::3" 32b instead of the source address "A000::5" 32a as a default source address.

Hence, reachability preferences of the default gateway router 28 can be communicated to the host device 30 based on ordering the associated prefixes 20e and 20f according to the determined preferences for the respective exit routers 14a and 14b, enabling the host device 30 to select the appropriate source address 32 without the necessity of implementing complex routing protocols within the host device 30.

Figure 2:
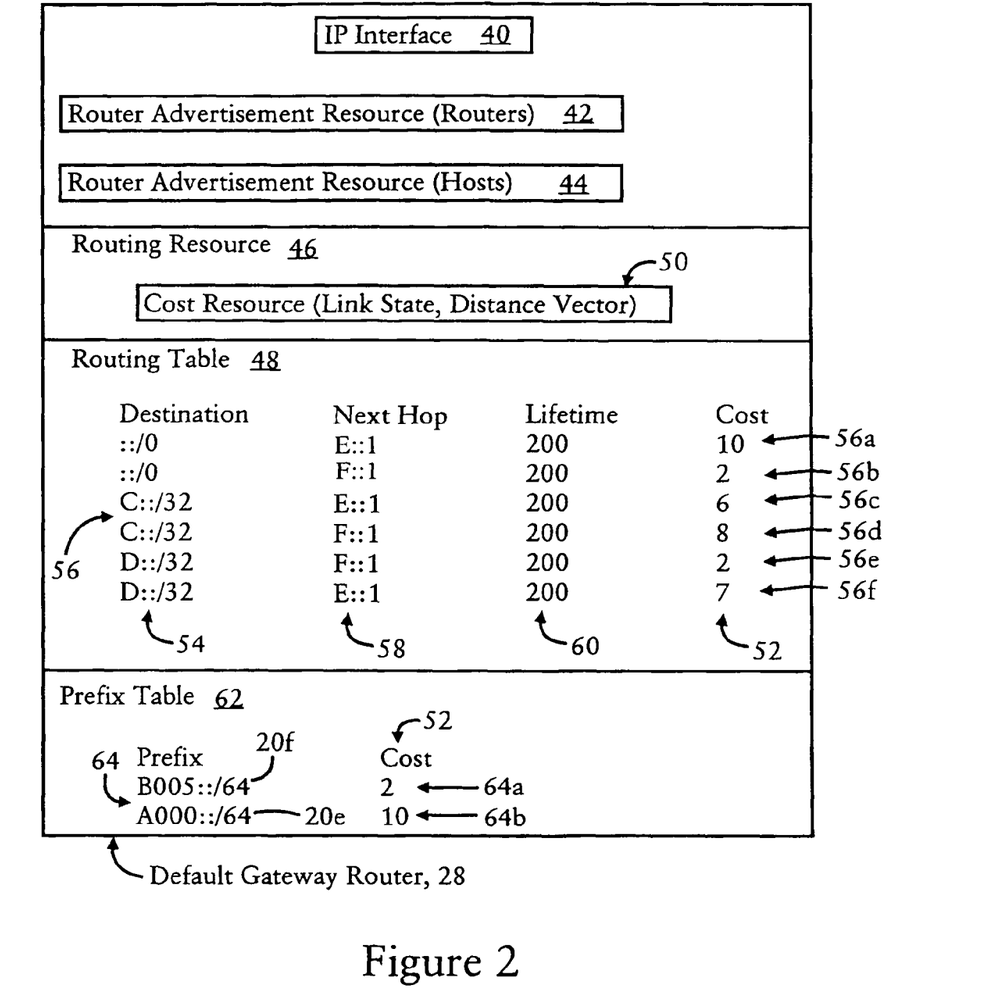
FIG. 2 is a diagram illustrating the default gateway router of FIG. 1, according to an embodiment of the present invention.

FIG. 2 is a diagram illustrating in detail the default gateway router 28 of FIG. 1, according to an embodiment of the present invention. The default gateway router 28 includes an Internet protocol (IP) interface 40, a router advertisement resource 42 configured for sending routing protocol exit router messages to other routers (e.g., routers 26, 14), a second router advertisement resource 44 for sending routing protocol exit router messages to the host device 30 as described below, a routing resource 46, a routing table 48, and a prefix table 62. The routing resource 46 includes a cost resource 50 configured for determining a cost 52 to reach destinations 54, for example according to a link state protocol or a distance vector routing protocol.

The IP interface 40 is configured for receiving packets from the private network 24, including the routing protocol exit router messages 22a' and 22b' identifying the respective address prefixes 20c and 20d assigned to the exit routers 14a and 14b. The routing resource 46 is configured for processing the routing protocol exit router messages 22a' and 22b' according to the existing routing protocols, and creating routing table entries 56 and prefix table entries 64 in response to the received routing protocol exit router messages. For example, the routing resource 46 creates the routing table entry 56a and the prefix table entry 64b in response to the routing protocol exit router message 22a' advertising the exit router 14a as a default router having the address prefix "A000::/48" 20c available for source address assignment: the routing resource 46 parses the routing protocol exit router message 22a' and inserts into the routing table entry 56a that the default route "::/0" is reachable via a next-hop router (e.g., "E") 26 having an address (e.g., "E::1") 58. The routing resource 46 also creates the routing table entry 56b and the prefix table entry 64b in response to parsing the routing protocol exit router message 22b', specifying the exit router 14b is available as a default router using the source address prefix "B005::/48" 20d, by specifying that the default route "::/0" is reachable via a next-hop router (e.g., "F") 26 having an address (e.g., "F::1") 58: note that the next-hop addresses do not necessarily need to be within the assigned address range of the address prefixes 20c or 20d. In addition, the cost resource 50 is configured for determining the cost 52 for reaching the identified destination 54, and adding the cost value to the corresponding entry 56. Each routing table entry 56 also includes a lifetime field 60.

Hence, the routing table 56 specifies the reachability of various destinations 54 via next-hop routers 58 according to the determined preference, illustrated as the cost 52. Hence, the router 28 will prefer to use the entry 56b instead of 56a for a default route to reach the wide area network 14, since the corresponding cost ("2") 52 for the routing table entry 56b is less than the corresponding cost ("10") 52 for the entry 56a. Consequently, the default gateway router 28 will prefer to use the exit router 14b, identified based on the address F::1 of the next-hop router. As illustrated in FIG. 2, the routing resource 46 arranges the prefix table entries 64 according to the corresponding determined cost 52 for reaching the default router (e.g., 14a), such that the entries 64 are arranged in the order of preference as measured by the cost 52.

According to the disclosed embodiment, the determined preference for reaching the exit routers 14a and 14b, as identified by the respective costs 52 and as illustrated in the prefix table 62, is communicated to the host device 30 based on ordering the address prefixes 20e and 20f in the routing protocol exit router message 22c according to the determined preference. In particular, the router advertisement resource 44 creates the routing protocol exit router message 22c based on identifying the stored prefixes 20f and 20e in the prefix table 62 for the default routes, and ordering those stored prefixes according to the costs 52 as illustrated in the prefix table 62. Hence, the ordering of the address prefixes 20e and 20f within the routing protocol exit router message 22c enables the host device 32 select a source address from the advertised prefixes 20e and 20f according to the determined order based on the determined preference of the default gateway router 28 for reaching the exit routers 14a and 14b.

Figure 4A:
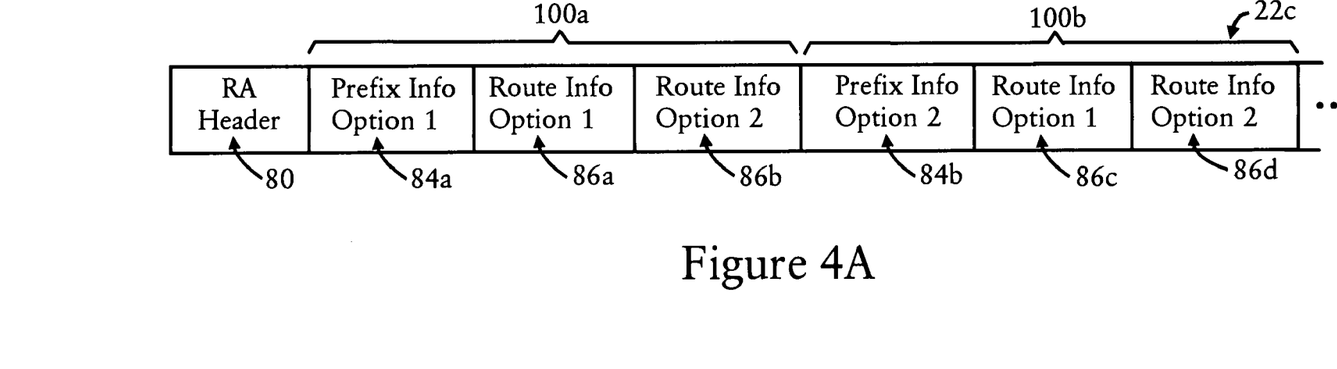
FIGS. 4A and 4B are diagrams illustrating in detail a routing protocol exit router message output by the default gateway router of FIG. 1, having source address prefixes arranged in a determined order based on the determined preference for reaching the first and second exit routers according to one embodiment of the present invention.
Figure 4B:
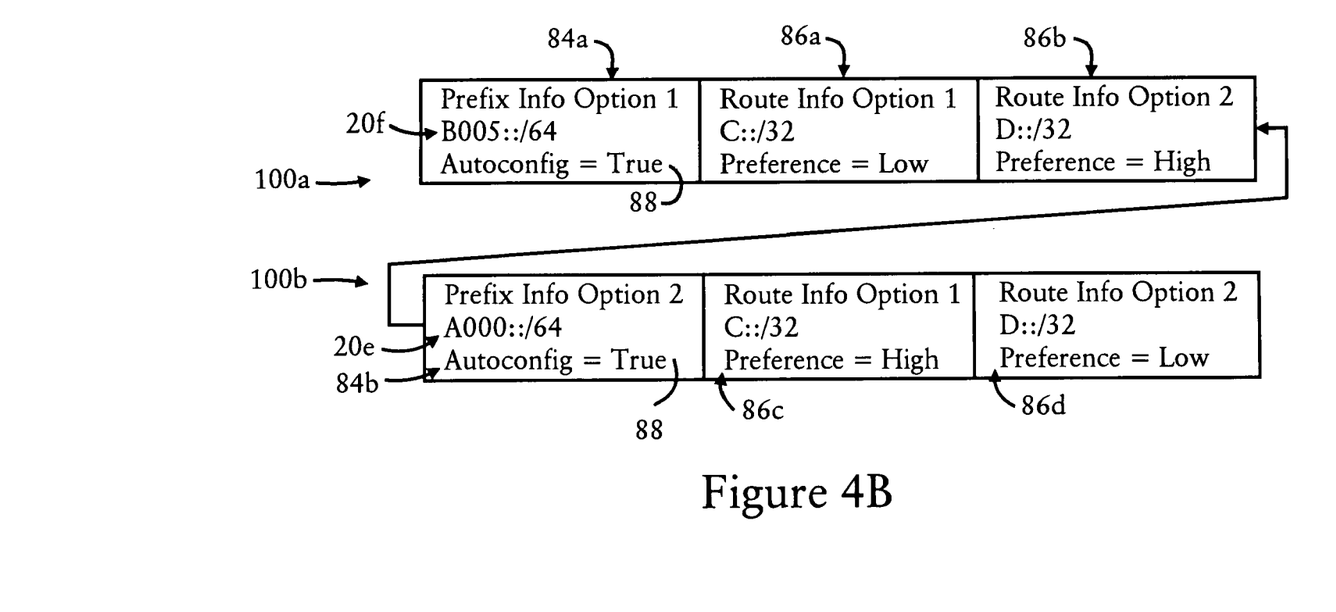

FIGS. 4A and 4B are diagrams illustrating the routing protocol exit router message 22c generated by the router advertisement resource 44 and output to the host device 30, according to one embodiment of the present invention. The router advertisement resource 44 is configured for generating the routing protocol exit router message 22c according to RFC 2461, entitled "Neighbor Discovery for IP Version 6 (IPv6)", and according to the above-described Internet Draft by Draves et al., entitled "Default Router Preferences and More-Specific Routes". In particular, the routing protocol exit router message includes a router advertisement header 80 in accordance with RFC 2461, prefix option portions 84a, 84b in accordance with Section 4.6.2 of RFC 2461, and route information options 86a, 86b, 86c, and 86d in accordance with the above-described Internet Draft by Draves et al.

As described above and as illustrated in further detail in FIG. 4B, the router advertisement resource 44 orders the address prefixes 20e and 20f in the routing protocol exit router message 22 according to the determined preference by the cost resource 50 and as illustrated in the prefix table 62 of FIG. 2, namely that the prefix 20f is preferred for address selection before the address prefix 20e due to the cost "2" 52 of the prefix "B005::/64" 20f being less than the corresponding cost "10" 52 of the prefix "A000::/64". Hence, the first prefix information option field "Prefix Info Option 1" 84a specifies the most preferred address prefix "B005::/64" 20f, and the next prefix information option field "Prefix Info Option 2" 84b specifies the next preferred address prefix "A000::/64" 20e. Hence, the ordering of the address prefixes "B005::/64" 20f and "A000::/64" 20e in the respective prefix information option fields 84a and 84b, according to the sequence determined by the preference 52 for reaching the respective routers 14a and 14b, enables the host device 32 select a source address from the preferred address prefix 20f specified in the first prefix information option field 84a. The host device 30 also can perform autonomous address configuration as specified in RFC 2462, based on the autonomous address configuration flag 88 being enabled.

As illustrated in FIGS. 4A and 4B, the route information option fields 86a, 86b, 86c, and 86d are grouped in source address prefix groups 100a and 100b, in other words relative to a prefix information option field 84, to enable the host device 30 also to identify a preferred source address to be selected based on the destination of a given packet. In particular, FIG. 2 illustrates that the routing table 48 includes multiple entries 56c and 56d for reaching the destination prefix "C::/32" 54, and entries 56e and 56f for reaching the destination prefix "D::/32" 54. Although the gateway router 28 can use the next hop router address 58 in order to direct a packet, for example by generating a routing header, it is preferred that the host device 30 need not be modified to perform additional routing protocols; the Internet Draft by Draves et al. describes that default router preferences and more specific routes can be communicated from routers to hosts, however Draves et al. assumes that the host device selects a destination router from among multiple routers with which the host device has an established link. As illustrated in FIG. 1, however, in many instances the host device 30 only will be connected to a single default gateway router 28.

Consequently, it has been determined that it is preferable that the host device 30 can route packets based on selection of the appropriate source address, since the default gateway router 28 can perform its own route optimization; further, source address selection in accordance with route optimization ensures that the most appropriate source address prefix is utilized, especially in instances where the ingress filtering rules may be applied by either the associated exit router 14 or an intermediate router 26 within the relevant address domain.

As illustrated in FIG. 1, the destination "C::/32" is the router "C", which is geographically located in San Francisco, Calif., in proximity to the exit router 14a; hence, the cost resource 50 in the gateway router 28 of FIG. 2 may determine that it is preferable for a host device 30 to utilize the source address prefix "A000::/64" 20e for packets destined to the destination "C::/32" 54 (based on the next-hop router "E" having the address "E::1" being in proximity to the exit router14a). Similarly, the destination "D::/32" is the router "D" which is geographically located in New York, in proximity to the exit router 14b; hence, the cost resource 50 in the gateway router 28 may determine that it is preferable for a host device 30 to utilize the source address prefix "B005::/64" 20f for packets destined to the destination "D::/32" 54 (based on the next-hop router "F" having the address "F::1" being in proximity to the exit router 14b).

Hence, the router advertisement resource 44 is configured for adding the route information option fields 86 at respective positions relative to the prefix information option fields 84 that enables a host device 30 to select the source address that should be selected based on the destination of the packet. As illustrated in FIGS. 4A and 4B, the router advertisement resource 44 adds the prefix information option fields 84a and 84b (specifying the respective prefixes 20f and 20e) in the determined order specified in the prefix table 62, and adds the route information option fields 86a and 86b following the first prefix information option field 84a as part of the source address prefix group 100a; hence, the host device 30, in response to parsing route information option fields 86a and 86b contiguously following the prefix information option field 84a, will be able to determine that the route information option fields 86a and 86b in the source address prefix group 100a are related to use of the source address prefix 20f specified in the prefix information option 84a. Similarly, in response to parsing the route information option fields 86c and 86d contiguously following the prefix information option field 84b, the host device 30 will be able to determine that the route information option fields 86c and 86d in the source address prefix group 100b are related to use of the source address prefix 20e specified in the prefix information option 84b.

Consequently, the host device 30 will be able to determine from the routing protocol exit router message 22c that: use of the source address prefix "B005::/64" 20f is preferred for source address selection for default destinations ("::/0") and destinations within the destination address prefix "D::/32"; and use of the source address prefix "A000::/64" 20e is preferred for source address selection only for destinations within the destination prefix "C::/32" based on the route information option field 86c grouped with and following the prefix information option field 84b within the source address prefix group 100b.

Figure 3:
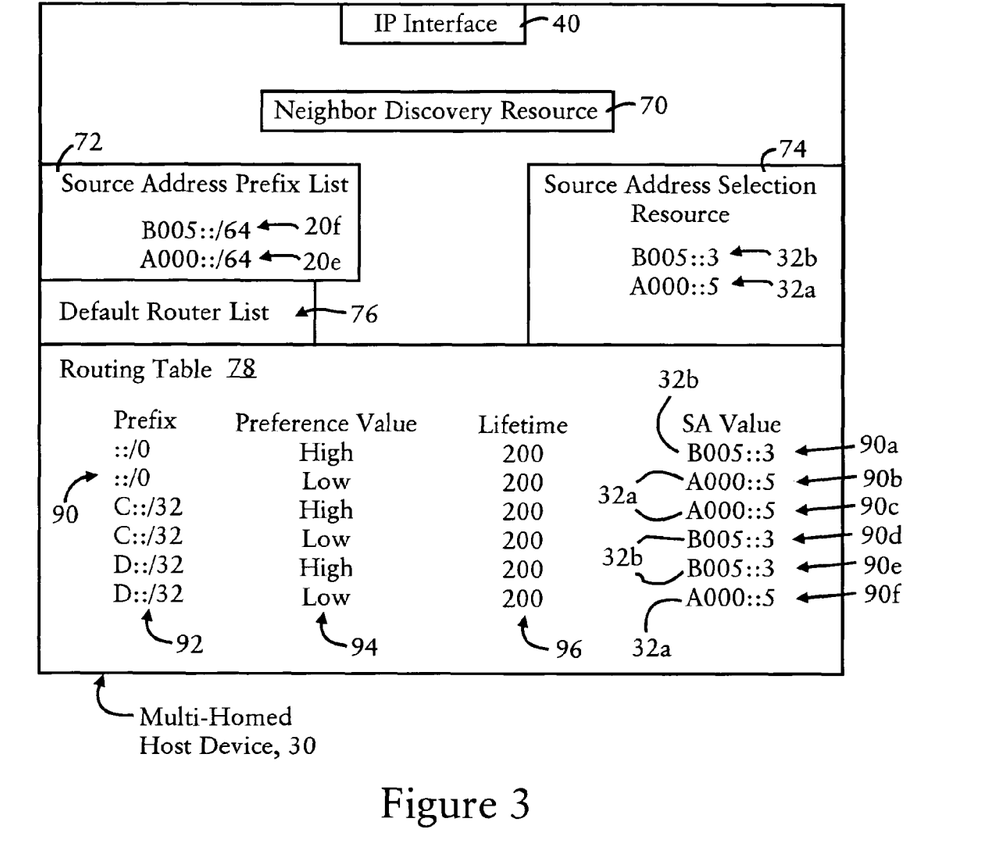
FIG. 3 is a diagram illustrating the host device of FIG. 1, according to an embodiment of the present invention.

FIG. 3 is a diagram illustrating the host device 30, according to an embodiment of the present invention. The host device 30 includes an IP interface 40 configured for receiving the routing protocol exit router message 22c output by the default gateway router 28, a neighbor d discovery resource 70, a source address prefix list 72, a source address selection resource 74, a default router list 76, and a routing table 78.

The neighbor discovery resource 70 is configured for outputting router solicitation messages as specified in RFC 2461. The neighbor discovery resource 70 also is configured for parsing the routing protocol exit router messages 22c and 22c' of FIGS. 5A-5C (described below), adding the address prefixes 20e and 20f to the source address prefix list 72, and populating the routing table 78 based on the ordering of the prefix information option headers 84 and the route information option fields 86 within the routing protocol exit router messages, as described herein. The neighbor discovery resource 70 also is configured for populating the default router list 76 with the IP address of the default router, namely the default gateway router 28. As recognized in the art, the default gateway router 28 also may be selected from a plurality of available routers that are specified in the default router list 76. The source address selection resource is configured for selecting a source address 32a and 32b from the advertised prefixes 20e and 20f, and ordering the source address prefixes according to the determined default preference.

The neighbor discovery resource 70 is configured for populating the routing table 78 with routing table entries 90 based on the received routing protocol exit router message 22c or 22c'. As described in the Internet Draft by Draves et al. at section 3.1, the routing table entries 90 include a destination field 92, a preference value 94, and a lifetime value 96. However, instead of using a next hop router field as suggested by Draves et al., the disclosed embodiment utilizes the preferred source address value based on the received routing protocol exit router messages.

For example, in response to receiving the routing protocol exit router message 22c of FIGS. 4A and 4B (or 22c' or 22c'' of FIGS. 5A-5C), the neighbor discovery resource 70 populates the source address prefix list 72 and the routing table 78 to specify that use of the source address prefix "B005::/64" 20f is preferred for source address selection of the source address 32b for default destinations ("::/0") (as expressed by the table entry 90a), and destinations within the destination prefix "D::/32" (as expressed by the table entry 90e). In addition, the neighbor discovery resource 70 populates the source address prefix list 72 and the routing table 78 to specify that the use of the source address prefix "A000::/64" 20e is preferred for source address selection over the source address prefix "B005::/64" only for destinations within the destination prefix "C::/32" (as expressed by the table entry 90c specifying a corresponding preference value 94 of "High") based on the route information option field 86c grouped with and following the prefix information option field 84b.

Hence, the source address selection resource 74 can select one of the source IP addresses 32a or 32b for default destinations based on the order of the prefixes within the routing protocol exit router message 22c (as expressed by the table entries 90a and 90b) and further modified to select based on the destination addresses (as expressed by the table entries 90c, 90d, 90e, and 90f). As apparent from the foregoing, the availability of multiple source addresses also provides for fault tolerance: if a preferred exit router (e.g., 14*b*) is unavailable due to a failure, then the neighbor discovery resource 70 will delete any entry 90 that is not updated before expiration of the lifetime interval 96.

Figure 5A:
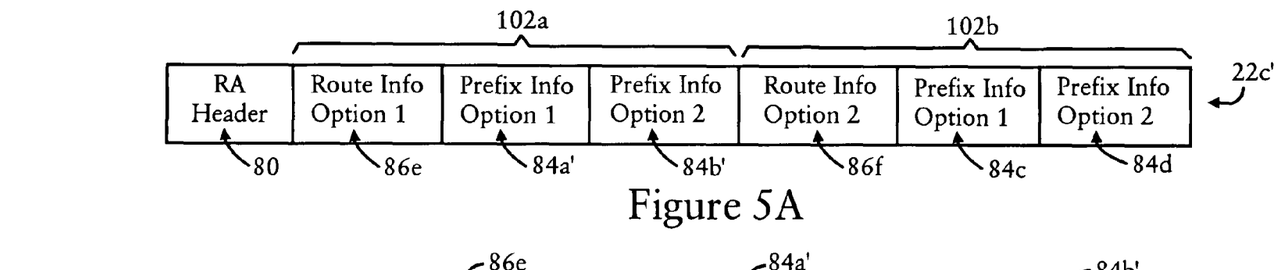
FIGS. 5A, 5B, and 5C are diagrams illustrating a routing protocol exit router message output by the default gateway router of FIG. 1, having source address prefixes arranged in a determined order based on the determined preference for reaching the exit routers, and relative to specified destination routes, according to a second embodiment of the present invention.
Figure 5B:
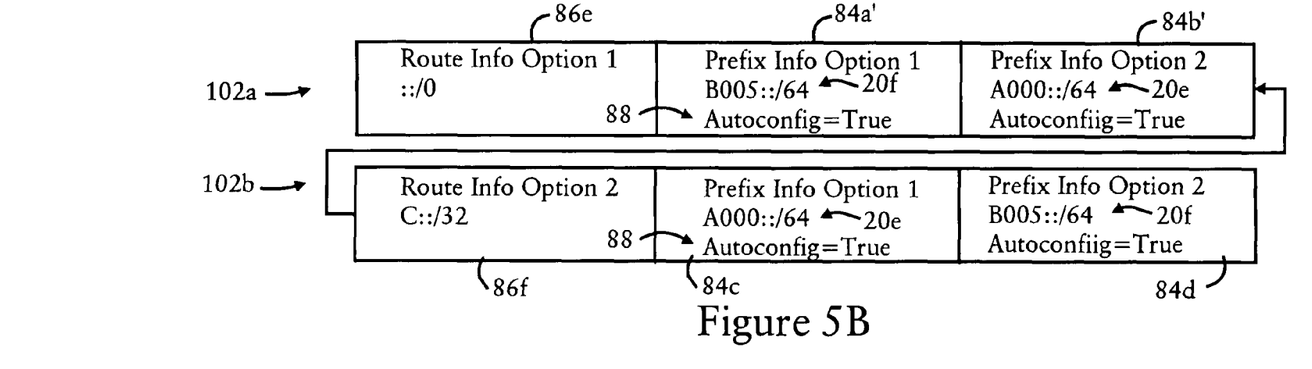
Figure 5C:
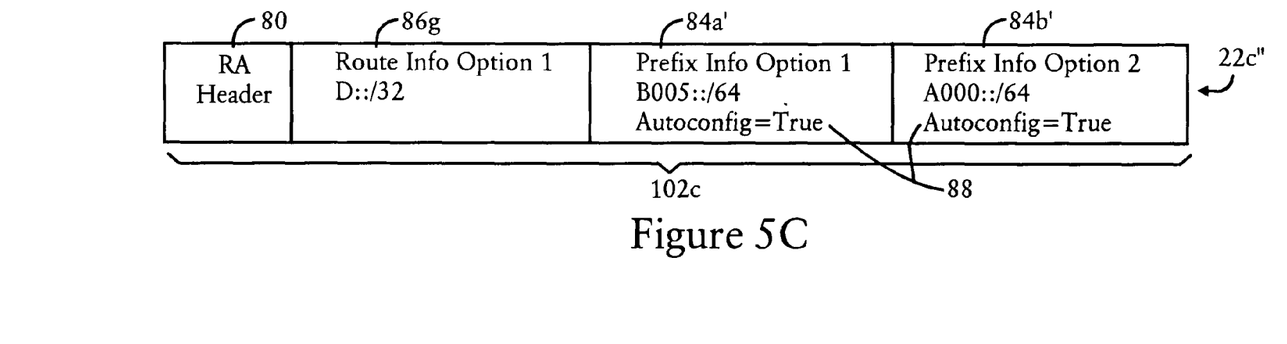

FIGS. 5A, 5B, and 5C are diagrams illustrating alternative implementations of the routing protocol exit router message 22*c*, which identify the address prefixes 20*e* and 20*f* in the determined order based on the preference of the respective exit routers 14*a* and 14*b*, according to an alternate embodiment of the present invention. FIGS. 5A and 5B illustrate an alternative routing protocol exit router message 22*c*', where the source address prefixes 20*e* and 20*f* are grouped according to a destination address prefix grouping 102*a* and 102*b*. Hence, the router advertisement resource 44 is configured for arranging the prefix information option fields 84*a*', and 84*b*' relative to and following a route information option field 86*e*, and the prefix information option fields 84*c* and 84*d* relative to and following the route information option field 86*f*; consequently, the determined order of the prefix information option fields explicitly identify the preference for the host device 30 to select the source address for reaching the corresponding destination address prefix.

Hence, the neighbor discovery resource 70 of the host device 30 can determine that for the default route "::/0" specified in the route information option field 86*e* of the grouping 102*a*, the preference for selecting source addresses is the source address prefix "B005::/64" 20*f* prior to any selection of the source address prefix "A000::/64" 20*e*, based on the order of the address prefixes 20*f* and 20*e* in the respective prefix information option fields 84*a*' and 84*b*' following the route information option field 86*e*. Similarly, the neighbor discovery resource 70 can determine that for grouping 102*b*, the destination "C::/32" specified in the route information option field 86*f*, the preference for selecting source addresses is the source address prefix "A000::/64" 20*e* prior to any selection of the source address prefix "B005::/64" 20*f*, based on the order of the address prefixes 20*e* and 20*f* in the respective prefix information option fields 84*c* and 84*d* following the route information option field 86*e*. Also note that a single destination address prefix grouping 102*c* may be inserted within a routing protocol exit router message 22*c*", as illustrated in FIG. 5C, for example in the form of an updated routing protocol exit router message that specifies the preferences 84*a*' and 84*b*' for a single route information option 86*g*.

Hence, both forms of routing protocol exit router messages as illustrated in FIGS. 4 and 5 enable the host device 32 establish the routing table 78 specifying the preferred source address values.

Figure 6:
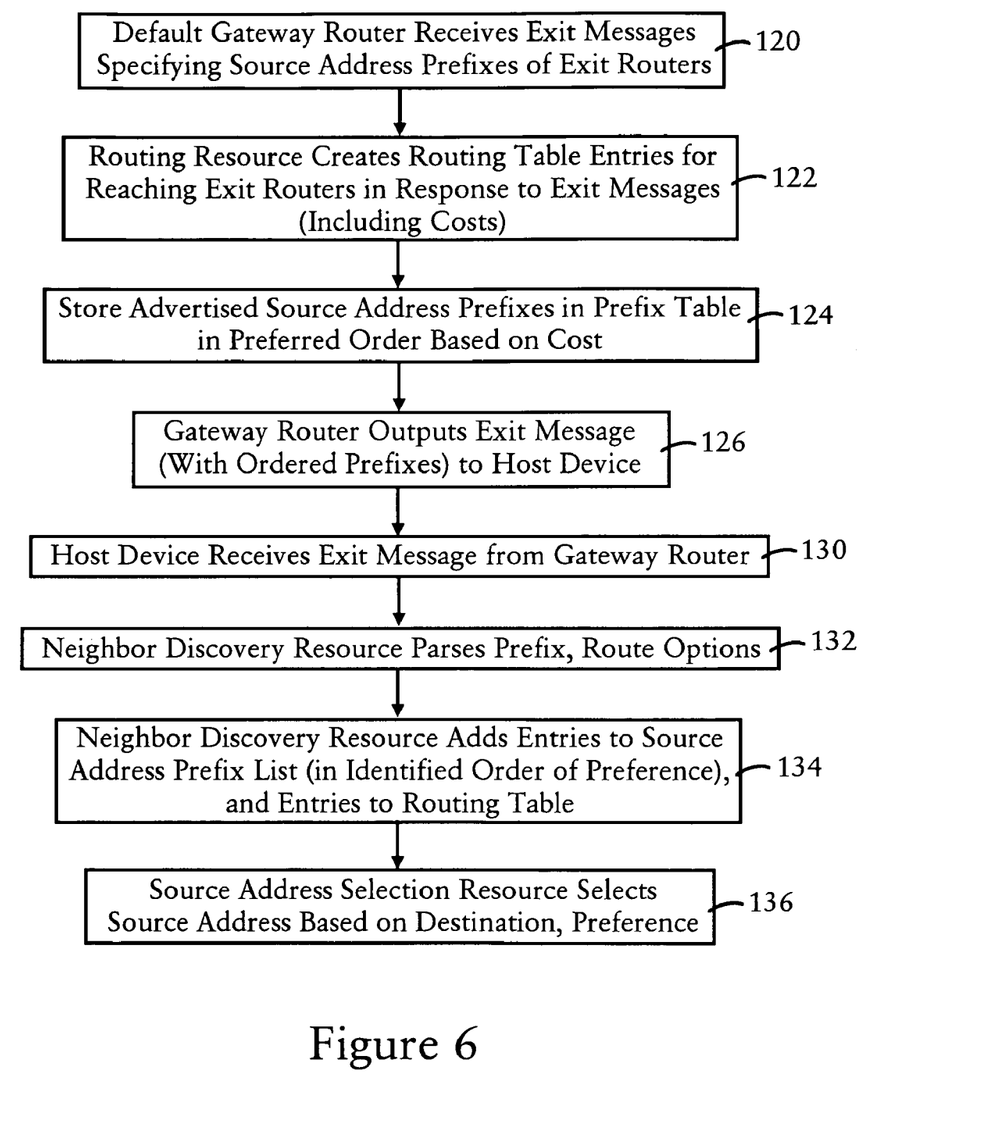
FIG. 6 is a diagram illustrating the method by the default gateway router of outputting a routing protocol exit router message specifying address prefixes in a determined order based on determined preference, and selection of a source address by the host device, according to an embodiment of the present invention.

FIG. 6 is a diagram illustrating the method by the default gateway router 28 and the multi-homed host device 30 of advertising preferred source address prefixes and selecting a source address, respectively, according to an embodiment of the present invention. The steps described herein can be implemented as executable code stored on a computer readable medium (e.g., floppy disk, hard disk, EEPROM, CD-ROM, etc.), or propagated via a computer readable transmission medium (e.g., fiber optic cable, electrically-conductive transmission line medium, wireless electromagnetic medium, etc.).

The method begins in step 120, where the default gateway router 28 receives the routing protocol exit router messages 22*a*' and 22*b*' (referred to as "exit messages" in FIG. 6) that identify the respective address prefixes "A000::/48" 20*c* and "B0000::/48" 20*d* having been advertised by the respective exit routers 14*a* and 14*b*. The routing resource 46 of the gateway router 28 creates in step 122 routing table entries 56 (e.g., 56*a*, 56*b*) for reaching the respective exit routers 14*a* and 14*b*, where the cost resource 50 determines the corresponding cost 52 for reaching the corresponding exit router. If desired, the routing resource 46 also stores the advertised source address prefixes 20*e* and 20*f* in the prefix table 62 in step 124 according to the preference 52, namely the cost for reaching the associated exit router having advertised the source address prefix 20.

The router advertisement resource 44 generates and outputs in step 126 the routing protocol exit router message (referred to as "exit message" in FIG. 6) to be supplied to the host device 30, for example according to source address prefix-based ordering as illustrated in FIGS. 4A and 4B, or alternately according to destination address prefix-based ordering as illustrated in FIGS. 5A, 5B, and 5C.

The host device 30 receives the routing protocol exit router message ("exit message") in step 130, and the neighbor discovery resource 70 of the host device 30 parses the received routing protocol exit router message in step 132. The neighbor discovery resource 70 populates in step 134 the source address prefix list 72 and the routing table 78 based on the parsed routing protocol exit router message, enabling the source address selection resource 74 to select the appropriate source address value 32*a* or 32*b* in step 136 based on a destination 92 specified in the routing table 78: as apparent from the foregoing, if the explicit address is not specified in the routing table 78, the source address selection resource 74 can select from the default entry 90*a*.

According to the disclosed embodiment, source address selection can be implemented in the host device 30 based on receiving preference information from the default gateway router 28 in the form of source address prefixes arranged in an order corresponding to the determined preference by the default gateway route router 28 in reaching the exit routers having advertised the source address prefixes. Hence, source address selection can be optimized based on router preferences, while maintaining ingress filtering rules implemented in the exit routers. In addition, source address selection can be further defined with respect to destination-based preferences implemented in the gateway router, enabling a host device to select source address prefixes based on selected destinations, without the necessity of implementing a routing protocol within the host device 30.

While the disclosed embodiment has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in a default gateway router configured for providing an access connection for a host device in a multi-homed network, the method comprising:

receiving, by the default gateway router, first and second routing protocol exit router messages identifying first and second distinct address prefixes having been advertised by first and second exit routers, respectively, the first and second exit routers providing respective connections between the multi-homed network and a wide area network;

determining by the default gateway router a preference for reaching a destination having an address prefix distinct from the first and second address prefixes, the preference determined based on the default gateway router determining respective costs for reaching the destination relative to the first and second routers; and sending to the host device, by the default gateway router via the access connection, a third address prefix that is a subset of the first address prefix, and a fourth address prefix that is a subset of the second address prefix, including sending the third and fourth address prefixes in a determined order identifying the determined preference for using one of the third or fourth address prefixes in reaching the destination, enabling the host device to select a source address from one of the third or fourth address prefixes according to the determined order for routing a packet to the destination by the host device according to the determined preference.

2. The method of claim 1, wherein the sending includes outputting to the host device a routing protocol exit router message that specifies the third address prefix and the fourth address prefix in the determined order.

3. The method of claim 2, wherein the outputting includes:
first adding to the routing protocol exit router message first and second prefix information option fields that specify the respective third address prefix and fourth address prefix in the determined order; and
second adding to the routing protocol exit router message at least one route information option field, specifying at least one of a default route as said destination or a corresponding destination address prefix as said destination, that enables the host device to select the source address from one of the third or fourth address prefixes, based on a position of the route information option field relative to the first and second prefix information option fields.

4. The method of claim 3, wherein the first adding includes arranging the first and second prefix information option fields relative to and following the at least one route information option field, the determined order explicitly identifying a preference in the host device selecting the source address from the one of the third or fourth address prefixes for reaching the destination.

5. The method of claim 3, wherein the second adding includes adding the at least one route information option field relative to and following one of the first or second prefix information option fields, the at least one route information option field associated with the one prefix information option field based on said following, the route information option field specifying a preference value for utilizing the associated address prefix for reaching the destination.

6. The method of claim 1, wherein the determining includes storing the first and second address prefixes in respective routing table entries, each routing table entry specifying the corresponding cost for reaching the corresponding exit router.

7. A multi-homed network configured for obtaining a plurality of access connections to a wide area network via first and second exit routers, the multi-homed network comprising:
a default gateway router configured for:
(1) receiving first and second routing protocol exit router messages identifying first and second distinct address prefixes having been advertised by the first and second exit routers, respectively,
(2) determining a preference for reaching a destination having an address prefix distinct from the first and second address prefixes, the default gateway router configured for determining the preference based on determining respective costs for reaching the destination relative to the first and second routers, and
(3) outputting a routing protocol exit router message specifying a third address prefix that is a subset of the first address prefix, and a fourth address prefix that is a subset of the second address prefix, in a determined order identifying the determined preference for using one of the third or fourth address prefixes in reaching the destination; and
a host device configured for receiving the routing protocol exit router message via an access connection provided by the default gateway router for the host device, the host device further configured for selecting a source address from one of the third or fourth address prefixes according to the determined order, for routing a packet to the destination according to the determined preference.

8. The multi-homed network of claim 7, wherein the default gateway router is configured for:
first adding to the routing protocol exit router message first and second prefix information option fields that specify the respective third address prefix and fourth address prefix in the determined order; and
second adding to the routing protocol exit router message at least one route information option field, specifying at least one of a default route as said destination or a corresponding destination address prefix as said destination;
the host device configured for selecting the source address from one of the third or fourth address prefixes, based on a position of the route information option field relative to the first and second prefix information option fields.

9. The multi-homed network of claim 8, wherein the first adding includes arranging the first and second prefix information option fields relative to and following the at least one route information option field, the determined order explicitly identifying a preference in the host device selecting the source address from the one of the third or fourth address prefixes for reaching the destination.

10. The multi-homed network of claim 8, wherein the second adding includes adding the at least one route information option field relative to and following one of the first or second prefix information option fields, the at least one route information option field associated with the one prefix information option field based on said following, the route information option field specifying a preference value for utilizing the associated address prefix for reaching the destination.

11. The multi-homed network of claim 7, wherein the default gateway router includes a routing table having routing table entries configured for storing the respective first and second address prefixes, each routing table entry specifying a corresponding cost for reaching the corresponding exit router.

12. A default gateway router comprising:
an Internet Protocol (IP) interface configured for receiving, from a multi-homed network, first and second routing protocol exit router messages identifying first and second distinct address prefixes having been advertised by first and second exit routers, respectively, the first and second exit routers providing respective connections between the multi-homed network and a wide area network, the default gateway router providing an access connection for a host device;
a routing resource configured for determining a preference for reaching a destination having an address prefix distinct from the first and second address prefixes, the routing resource configured for determining the preference based on determining respective costs for reaching the destination relative to the first and second routers; and
a router advertisement resource configured for sending to the host device, via the access connection, a third address prefix that is a subset of the first address prefix, and a fourth address prefix that is a subset of the second address prefix, in a determined order identifying the determined preference for using one of the third or fourth address prefixes in reaching the destination, enabling the host device to select a source address from one of the third or fourth address prefixes according to the determined order for routing a packet to the destination by the host device according to the determined preference.

13. The default gateway router of claim 12, wherein the router advertisement resource is configured for outputting to the host device a routing protocol exit router message that specifies the third address prefix and the fourth address prefix in the determined order.

14. The default gateway router of claim 13, wherein the router advertisement resource is further configured for:
   first adding to the routing protocol exit router message first and second prefix information option fields that specify the respective third address prefix and fourth address prefix in the determined order; and
   second adding to the routing protocol exit router message at least one route information option field, specifying at least one of a default route as said destination or a corresponding destination address prefix as said destination, that enables the host device to select the source address from one of the third or fourth address prefixes, based on a position of the route information option field relative to the first and second prefix information option fields.

15. The default gateway router of claim 14, wherein the router advertisement resource is further configured for arranging the first and second prefix information option fields relative to and following the at least one route information option field, the determined order explicitly identifying a preference in the host device selecting the source address from the one of the third or fourth address prefixes for reaching the destination.

16. The default gateway router of claim 14, wherein the router advertisement resource is further configured for adding the at least one route information option field relative to and following one of the first or second prefix information option fields, the at least one route information option field associated with the one prefix information option field based on said following, the route information option field specifying a preference value for utilizing the associated address prefix for reaching the destination.

17. The default gateway router of claim 12, wherein the routing resource is configured for storing the first and second address prefixes in respective routing table entries, each routing table entry specifying the corresponding cost for reaching the corresponding exit router.

18. A default gateway router comprising:
   means for receiving, from a multi-homed network, first and second routing protocol exit router messages identifying first and second distinct address prefixes having been advertised by first and second exit routers, respectively, the first and second exit routers providing respective connections between the multi-homed network and a wide area network, the default gateway router providing an access connection for a host device;
   means for determining a preference for reaching a destination having an address prefix distinct from the first and second address prefixes, the means for determining configured for determining the preference based on determining respective costs for reaching the destination relative to the first and second routers; and
   means for sending to the host device, via the access connection, a third address prefix that is a subset of the first address prefix, and a fourth address prefix that is a subset of the second address prefix, in a determined order identifying the determined preference for using one of the third or fourth address prefixes in reaching the destination, enabling the host device to select a source address from one of the third or fourth address prefixes according to the determined order for routing a packet to the destination by the host device according to the determined preference.

19. The default gateway router of claim 18, wherein the means for sending is configured for outputting to the host device a routing protocol exit router message that specifies the third address prefix and the fourth address prefix in the determined order.

20. The default gateway router of claim 19, wherein the means for sending is further configured for:
   first adding to the routing protocol exit router message first and second prefix information option fields that specify the respective third address prefix and fourth address prefix in the determined order; and
   second adding to the routing protocol exit router message at least one route information option field, specifying at least one of a default route as said destination or a corresponding destination address prefix as said destination, that enables the host device to select the source address from one of the third or fourth address prefixes, based on a position of the route information option field relative to the first and second prefix information option fields.

21. The default gateway router of claim 20, wherein the means for sending is further configured for arranging the first and second prefix information option fields relative to and following the at least one route information option field, the determined order explicitly identifying a preference in the host device selecting the source address from the one of the third or fourth address prefixes for reaching the destination.

22. The default gateway router of claim 20, wherein the means for sending is further configured for adding the at least one route information option field relative to and following one of the first or second prefix information option fields, the at least one route information option field associated with the one prefix information option field based on said following, the route information option field specifying a preference value for utilizing the associated address prefix for reaching the destination.

23. The default gateway router of claim 18, wherein the means for determining is configured for storing the first and second address prefixes in respective routing table entries, each routing table entry specifying the corresponding cost for reaching the corresponding exit router.

24. A computer readable storage medium encoded with computer executable instructions for a default gateway router to provide an access connection for a host device in a multi-homed network, the sequences of instructions including instructions for:
   receiving, by the default gateway router, first and second routing protocol exit router messages identifying first and second distinct address prefixes having been advertised by first and second exit routers, respectively, the first and second exit routers providing respective connections between the multi-homed network and a wide area network;
   determining by the default gateway router a preference for reaching a destination having an address prefix distinct from the first and second address prefixes, the preference determined based on the default gateway router determining respective costs for reaching the destination relative to the first and second routers; and sending to the host device, by the default gateway router via the access connection, a third address prefix that is a subset of the first address prefix, and a fourth address prefix that is a subset of the second address prefix, including sending the third and fourth address prefixes in a determined order identifying the determined preference for using one of the third or fourth address prefixes in reaching the destination, enabling the host device to select a source address from one of the third or fourth address prefixes according to the determined order for routing a packet to the destination by the host device according to the determined preference.

25. The medium of claim 24, wherein the sending includes outputting to the host device a routing protocol exit router message that specifies the third address prefix and the fourth address prefix in the determined order.

26. The method of claim 1, wherein the host device is connected only to the default gateway router.

27. The network of claim 7, wherein the host device is connected only to the default gateway router.

28. The default gateway router of claim 12, wherein the host device is connected only to the default gateway router.

29. The default gateway router of claim 18, wherein the host device is connected only to the default gateway router.

* * * * *